March 4, 1969  L. HEDBORG  3,430,785
TRANSPORT AND PILING DEVICE
Filed Oct. 17, 1967  Sheet 1 of 5

Inventor
Lennart Hedborg
By Cushman, Darby & Cushman
Attorneys

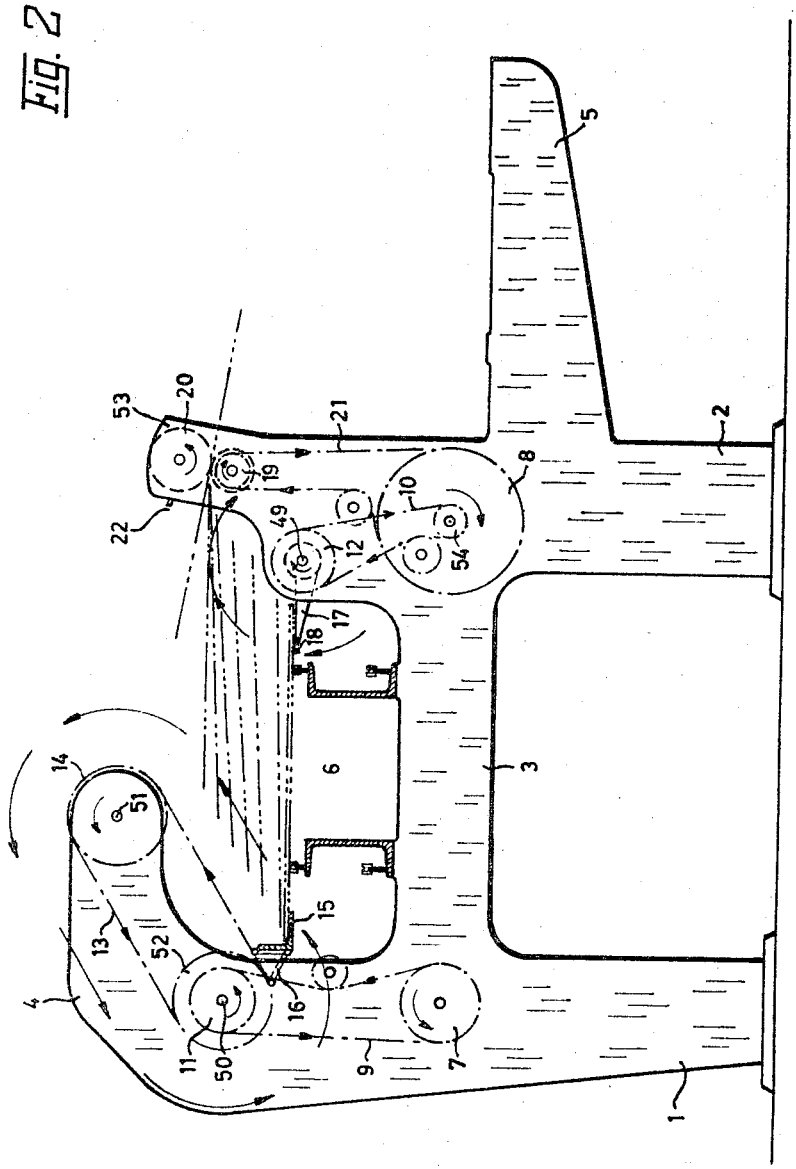

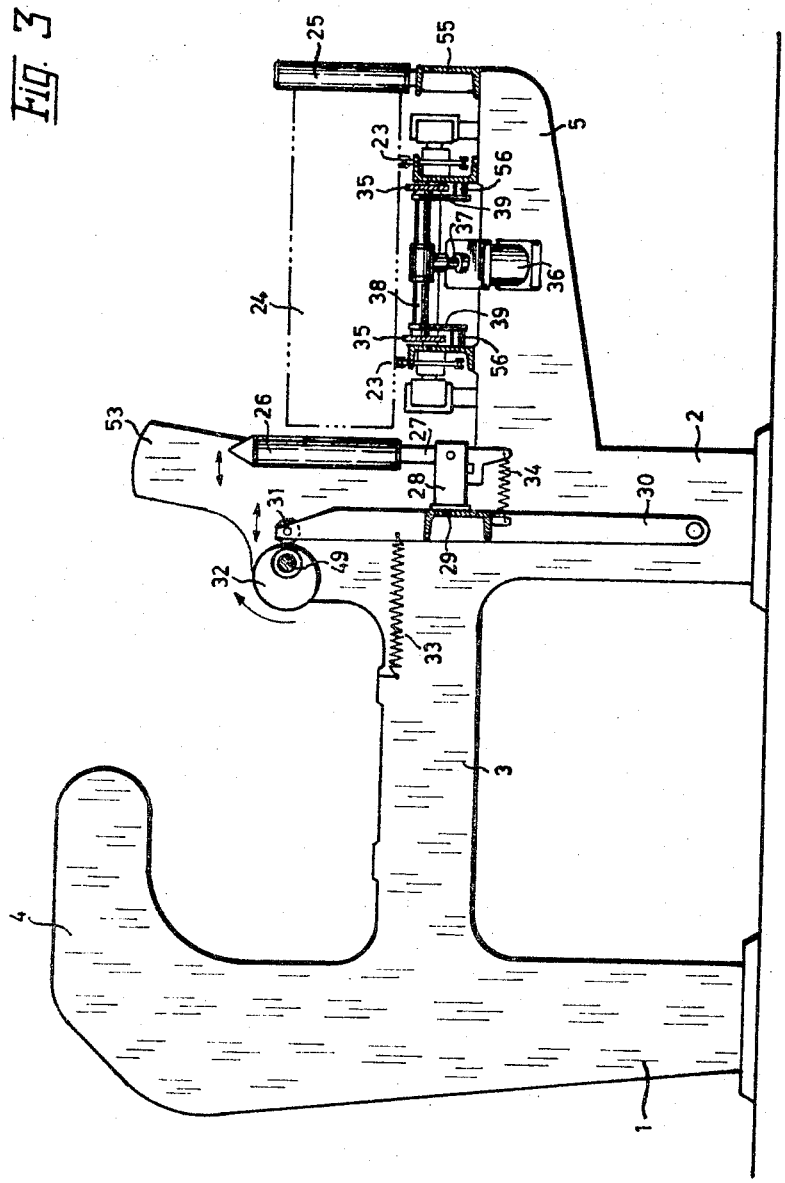

3,430,785
TRANSPORT AND PILING DEVICE
Lennart Hedborg, Overboelare, Belgium, assignor to Aktiebolaget Siefvert & Fornander, Kalmar, Sweden
Filed Oct. 17, 1967, Ser. No. 675,867
Claims priority, application Sweden, Oct. 18, 1966, 14,107/66
U.S. Cl. 214—6       10 Claims
Int. Cl. B65g 57/00, 59/00; B65h 29/12

ABSTRACT OF THE DISCLOSURE

This invention relates to a system for stacking veneer sheets or the like in mutually partly overlapping relation in a pile, comprising a first sheet conveyor by which said sheets are sequentially advanced, a second sheet conveyor which extends beside the first conveyor and has a substantially lower velocity than said first conveyor, and means for sequentially elevating the sheets advanced by said first sheet conveyor, transferring them in a lateral direction and depositing them onto the second conveyor in such a manner that they form a pile in which the sheets partly overlap each other.

---

This invention relates to a conveying and piling system generally comprising a primary conveyor with cooperating means for elevating and piling sheet products received e.g. from a cutter onto a secondary conveyor leading to a chopper.

The invention is applicable to a production line in the match industry for producing match splints from veneer sheets.

Hitherto the transport of veneer sheets from a cutter and the piling of said sheets on a conveyor leading to a chopper have been carried out manually, at least to a considerable extent.

The principal object of the invention is to replace the manual work by an automatically operating system of the above-mentioned type.

This and other objects are attained by the system according to the invention, which is characterized by:

(a) sheet elevating means comprising a bar which extends substantially parallel to the primary conveyor on one side thereof and is fastened to a plurality of rotatable arms for supporting the sheets near one of their longitudinal edges during the elevating operation in combination with an L-rail which is mounted on endless chains for supporting the sheets at the other one of their longitudinal edges during the elevating operation, said chains having their upper portions inclined towards the secondary conveyor;

(b) a pair of feeding rolls arranged between the primary and secondary conveyors;

(c) a series of stationary vertical rollers bordering one of the longitudinal edges of the secondary conveyor and a series of movable vertical rollers bordering the other one of the longitudinal edges of the secondary conveyor.

Further objects and advantages of the invention will be more fully apparent from the following description and the accompanying drawings illustrating a preferred embodiment of the invention, and in which:

FIG. 2 is a view from the left in FIG. 1 showing schematically the operation of the elevating means and the feeding rolls, some parts being omitted; and FIG. 3 is a view from the left in FIG. 1 showing schematically the secondary conveyor with the bordering rolls and another lifting device, certain parts being omitted.

Figure 1:
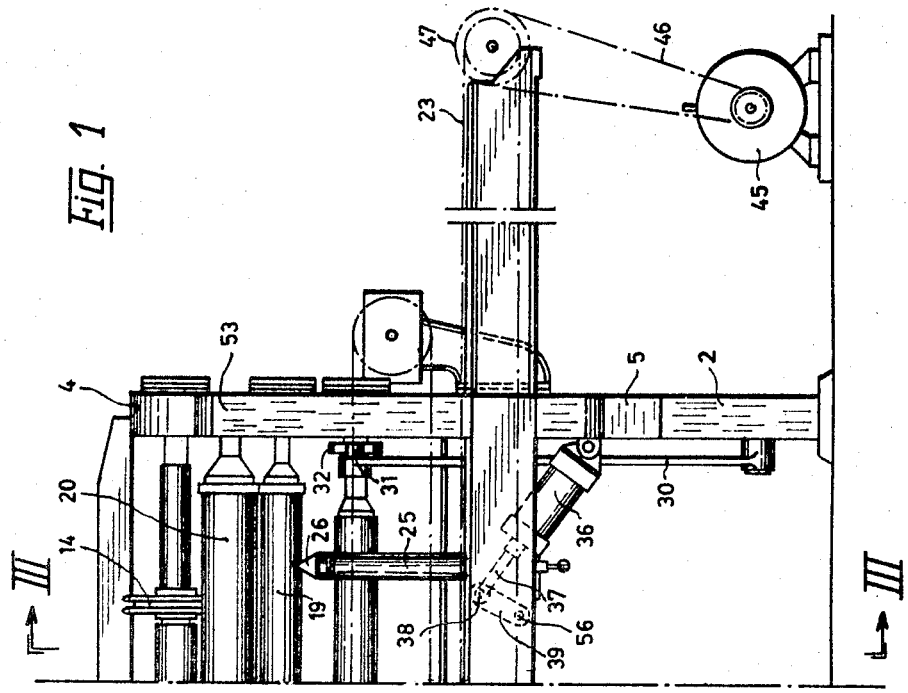
FIG. 1 shows the system according to the invention in a side view.
Figure 1:
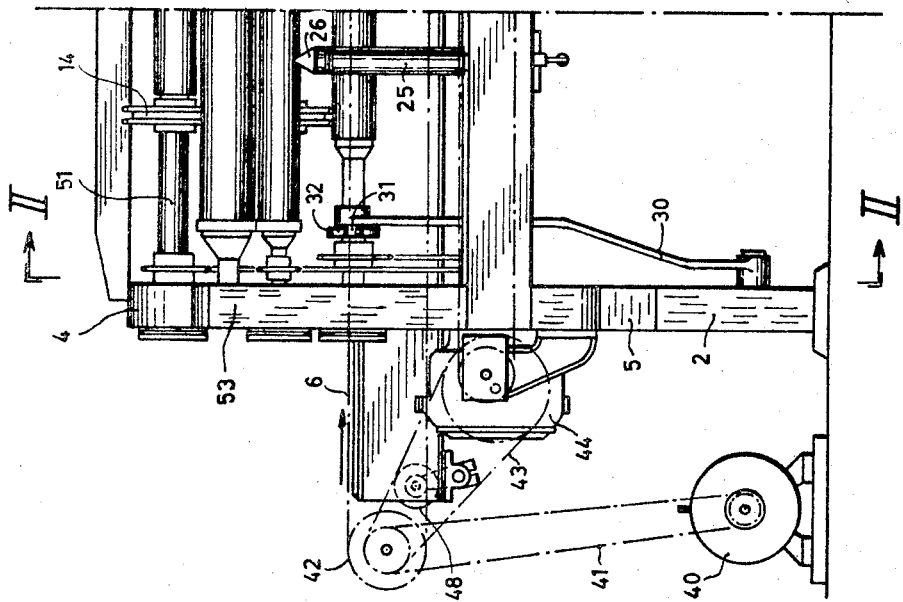

According to the drawings the system comprises posts 1 and 2 connected by cross beams 3. The upper ends of the posts 1 form horizontal arms 4 extending towards the posts 2, the upper ends of which form arms 53. The posts 2 are provided on an intermediate level with arms 5 extending in the same direction as the arms 4 and having their upper longitudinal edges on a level lower than the corresponding edges of the beams 3.

The beams 3 support a primary conveyor 6 (FIG. 2) which consists of endless chains or the like and leads from a cutter (not shown) for cutting a long veneer web received from a veneer lathe (not shown) into sheets of uniform length, to the system according to the invention. The conveyor 6 is driven by a motor 40 (FIG. 1) by means of a chain 41 and chain wheels 42 and is synchronized with the cutter. The driving power can also be taken from the cutter, so that a special motor is not required and synchronization is achieved automatically.

By means of the chain wheels 42 the driving power is transmitted to a cardan shaft over a chain or the like 43, which can be strained by means of a tightener 48, and to two gears 44 (FIG. 1) arranged on the intake-side of the system in the end regions of the intake-side crossbeam 3. The left gear (as seen from the left in FIG. 1) drives a chain wheel 7 (FIG. 2), which in its turn by means of a chain 9 drives another chain wheel 11 located above the wheel 7. Another chain wheel 52 coaxial with the wheel 11 drives two or more chains 13, which are arranged in mutually parallel vertical planes and are guided around chain wheels 14 mounted on a through shaft 51 between the ends of the arms 4 (FIGS. 1 and 2). In this way the chains 13 are inclined with respect to the posts 1. The chains 13 form an angle of about 30–45° with the plane of the conveyor 6.

To the chains 13 the ends of one through V-iron or a number of V-iron sections 16 are attached, the shanks of which are hingedly connected to each other. One of the legs of each V-iron section carries a preferably through L-beam 15, the free leg of which is horizontal and is directed towards the arms 53 under its movement upwards along the lower linear part of the path of the chains 13.

The right-hand gear (as seen from the left) in FIG. 1 drives a chain wheel 54 (FIG. 2), which drives in its turn a chain wheel 12 which is arranged at the right-hand side of the conveyor 6 and has its center substantially on the same level as the plane of the conveyor 6. The chain wheel 12 rotates a through shaft 49, which carries a plurality of radially extending arms 17, to the free ends of which a through bar or the like 18 is secured, which when rotating passes the right-hand side of the primary conveyor 6.

Another chain wheel 8 arranged coaxially with the wheel 54 is driven simultaneously therewith. The wheel 8 drives by means of a chain 21 a feeding roll 19 extending in the longitudinal direction of the system. The highest peripheral point of the roll 19 is located on about the same level as the highest point of the path of rotation described by the bar 18. The roll 19 drives by friction engagement another feeding roll 20 which extends between the ends of the arms 53 above the roll 19 and is adapted to be pivoted around the axis of the roll 19 through a certain arc by means of an adjusting screw 22, so that the feeding direction of the pair of rolls 18, 19 can be adjusted upwards and downwards.

The output part of the system is mainly constituted by a secondary conveyor 23 (FIGS. 1 and 3) carried by the arms 5. This conveyor extends substantially parallel to and has the same feeding direction as the primary conveyor 6. The conveyor 23 leads to a chopper, e.g. for producing match splints, and may be driven by an individual motor 45 by means of a chain or the like 46 and a chain wheel 47 in synchronism with the chopper. Alternatively, the conveyor 23 may be driven by the chopper, so that synchronization is achieved automatically.

On the right-hand longitudinal side in FIG. 3 the conveyor 23 is bordered by stationary, rotatable rollers 25 arranged on a supporting beam 55, which rests upon the ends of the arms 5. On its other longitudinal side the conveyor 23 is bordered by rollers or the like 26 movable towards and away from the conveyor 23. The rollers 26 are preferably provided with conical or rounded tops and are arranged on vertical shafts 27 which near their lower ends are pivotally connected to horizontal arm 28 preferably constituted by U-sections and connected to a beam 29 which extends between two oscillating arms 30. The lower ends of the arms 30 are pivoted to the inner sides of the posts 2. The upper ends of the arms 30 are provided with rollers 31, which are held in engagement with cam discs 32 by means of tension springs 33 secured to the arms 30 and to suitable points of the frame. The cam discs 32 are preferably arranged on the shaft 49 which carries the lifting arms 17, or are at least actuated by or synchronized with the power system driving the shaft 49. In this way the rollers 26 are advanced towards the conveyor 23 just in that moment, when a veneer sheet has been deposited onto the conveyor 23. The lower ends of the shafts 27 are connected to a spring 34, the other end of which is fastened on the beam 29. This permits gentle and cautious treatment of the veneer sheets. Furthermore, the upper ends of the rollers 26 can be inclined towards the rollers 25 in their home or starting position, so that the rollers 26 always engage the uppermost veneer sheet first, which is pressed against the rollers 25 longer and more intensely than the underlying veneer sheets.

The conveyor 23 is also provided with a lifting device constituted by bars or the like 35 which extend parallel to the conveyor 23 and can be raised diagonally backwards (in relation to the direction of transport) by means of rams or pressure cylinders 36. The projecting ends of the pistons 37 are centrally and rotatably connected to one of two transverse shafts 38, the ends of which are fastened at right angles to the bars 35. The ends of the transverse shafts 38 are journalled in the upper ends of links 39, which are inclined downwards and to the left in FIG. 1, and the lower ends of which are hingedly mounted, e.g. on stub shafts 56 on stationary parts of the conveyor 23 or the frame. It is also possible to arrange a plurality of links 39 along the bars 35 in the manner described above.

The operation of the system is as follows:

A veneer sheet cut by the cutter is fed into the system according to the invention by means of the conveyor 6. As soon as the veneer sheet has been introduced, it is elevated by the L-beam 15 in cooperation with the arms 17 and the bar 18. These elevating devices 15 and 17, 18 are dimensioned and synchronized in such a way, that they simultaneously elevate the sheet by gripping under the longitudinal edges of the sheet. The lifting movement of the L-beam 15 extends along a straight path as determined by the lower parts of the chains 13, but that of the bar 18 extends along an arc of a circle (substantially a quarter of a circle). A result of this is, that the speed of elevation of the L-beam is uniform, and that the speed of elevation of the bar 18 is higher in the beginning and lower at the end of the lifting period in relation to the lifting speed of the L-beam 15, so that a veneer sheet becomes more and more inclined during the first part of the lifting period and less and less inclined during the second part of the lifting period in FIG. 2. At the same time the veneer is raised diagonally upwards to the right in FIG. 2 into the feeding zone between the rolls 19 and 20. The veneer is fed in between the rolls with its right longitudinal edge first, when the bar 18 has reached the top zone of its circular path. When the sheet is introduced between the rolls 19, 20 the lifting period of the right-hand side of the sheet is finished or almost finished, but its left-hand side is still being elevated, while the veneer sheet is moved to the right in FIG. 2. In this way the effective lifting path of the L-beam 15 is substantially extended, and when the veneer leaves the L-beam 15, it has already been introduced a considerable amount between the rolls 19, 20. As soon as a veneer sheet is lifted up over the conveyor 6 a new sheet can be received thereby. The respective speeds of the cutter, the conveyor 6, and the elevating devices 15, 18 have been selected in such a way that a veneer sheet is elevated only when entirely introduced into the system.

After having been advanced in the transverse direction by the rolls 19, 20 the sheets fall by gravity onto the secondary conveyor 23 or onto the stack of sheets already lying thereon. Due to the motion of this conveyor the transverse edges of adjacent sheets become staggered in such a manner that each sheet partly overlaps a plurality of sheets previously deposited onto the conveyor 23 and is partly overlapped by a plurality of sheets subsequently deposited onto the conveyor 23. When falling down the sheets are arrested by the engagement of their right-hand longitudinal edge in FIG. 3 with the rolls 25. Sheets which might have fallen down in an inclined position are gently pushed against the rolls 25 by the movable rolls 26. The pile of sheets is continuously advanced into the chopper and chopped to match splints. Choppers with reciprocating knives as well as choppers with rotatable knives may be used. Generally, a chopper with reciprocating knives can chop a thicker or higher pile than a chopper with rotatable knives. The maximum pile height is about 100–120 mm. for a rotatable chopper, and about 200 mm. for a reciprocating chopper.

The system according to the invention can be connected to a chopper of either type driven with its highest capacity. This can be achieved by adjusting the speed of the system and possibly of the cutter and/or by arranging the axis of one of the rolls 19, 20 movable in a portion of a circular path in relation to the other roll. Preferably the friction-driven roll is movable in relation to the chain-driven roll. In this way different feeding angles optimal for each pile height can be achieved.

To avoid the formation of buckles or waves in the veneer pile at the entrance to the chopper, the speed of the conveyor 23 is preferably about 2.5% lower than the speed of the feeding rolls of the chopper.

In case of a break-down of the chopper, the pile can be raised above the conveyor 23 by means of the cylinders 36 and the members cooperating therewith. The leverage of this lifting devic allows use of minor cylinders for elevating heavy weights.

Having thus described my invention with particular reference to the preferred form thereof, it will be obvious to those skilled in the art to which the invention pertains, after understanding my invention, that various changes, omissions, and modifications may be made therein without departing from the spirit and scope of my invention.

I claim:

1. A conveying and piling system for conveying veneer sheets from a cutter to a chopper for producing match splints, comprising a primary conveyor adapted to receive said veneer sheets, a secondary conveyor arranged beside said primary conveyor and leading to said chopper, and elevating and transferring means cooperating with said primary conveyor and adapted to elevate the advanced sheets and pile them on said secondary conveyor, characterized by the combination of (a) lifting means comprising driving wheels arranged on both sides of said primary conveyor and synchronized with each other, each of said driving wheels being adapted to drive an elevating device, one of said elevating devices being constituted of a longitudinal bar-like member which is adapted to grip under the adjacent longitudinal edge of the sheets and extends substantially throughout the entire length of the sheets and is arranged on the ends of arms mounted on a rotatable shaft, the other one of said elevating devices being constituted by a through L-beam, which is adapted to grip under the other longitudinal edge of said sheets, and is carried by endless chains travelling around chain wheels, the driving power being taken from one of said driving wheels,
(b) two horizontal, mutually cooperating feeding rolls which are rotatable in opposite directions, are arranged between said conveyors and are adapted to receive said veneer sheets from said elevating devices at the end of the sheet elevating operation and to transfer said sheets to said secondary conveyor, and
(c) a series of stationary rolls bordering the outer, longitudinal edge of said secondary conveyor and being operative as guides for said pile, and a second series of rolls which border the other longitudinal edge of said second conveyor and are movable towards and away from said secondary conveyor, said second rolls being adapted to press said sheets against said stationary rolls.

2. A system according to claim 1, in which said endless chains for driving said L-beam have their upper parts inclined in the direction towards said secondary conveyor.

3. A system according to claim 1, in which one flange of said L-beam has a horizontal position under the lifting operation and points towards said primary conveyor.

4. A system according to claim 1, comprising a plurality of chains, each associated with one of said driving wheels, an equal plurality of V-irons having one of their shanks, which are joined by hinges, attached to a respective one of said chains and the second one of their two shanks secured to the other flange of said L-beam for supporting same.

5. A system according to claim 1, in which said elevating devices are adapted to operate at different lifting speeds, the lifting speed of said L-beam being uniform and that of said lifting arms being greater at the beginning and lower at the end of the lifting operation, in relation to the lifting speed of said L-beam.

6. A system according to claim 1 comprising a chain wheel transmission for driving one of said feeding rolls by means of one of said driving wheels.

7. A system according to claim 6 comprising means for moving the axis of said friction-driven feeding roll in an arc around said chain wheel driven feeding roll.

8. A system according to claim 1, comprising a swing-arm operated beam, a plurality of movable arms which are carried by said beam and each supports a shaft on which one of said movable rolls is journalled, and spring means secured to the lower ends of said shafts for imparting an elastic action to said movable rolls.

9. A system according to claim 8, comprising means for pivotally supporting their lower ends of said swing-arms, a cam follower provided on the upper end of each swing-arm, a cam disc associated with each cam follower, means for urging said cam followers against said cam discs to cause said swing action.

10. A system according to claim 1, comprising a lifting device associated with said secondary conveyor for raising said pile, e.g. in case of a break-down of the chopper.

References Cited
UNITED STATES PATENTS

| | | | |
|---|---|---|---|
| 1,581,583 | 4/1926 | Low | 214—6 X |
| 2,324,930 | 7/1943 | Joa | 198—35 X |
| 2,466,544 | 4/1949 | Harred | 214—6 X |
| 2,585,076 | 2/1952 | Bandura et al. | 214—6 |
| 2,846,086 | 8/1958 | Norwood | 214—6 |
| 3,061,066 | 10/1962 | Casino | 198—35 X |
| 3,270,630 | 9/1966 | Frappier et al. | 214—6 X |

FOREIGN PATENTS 540,372  4/1957  Canada.

GERALD M. FORLENZA, *Primary Examiner.*

ROBERT J. SPAR, *Assistant Examiner.*

U.S. Cl. X.R.
198—35; 271—76